Sept. 20, 1932.   F. W. WELLS   1,878,216
SCREW CUTTING DIE
Filed Aug. 15, 1928
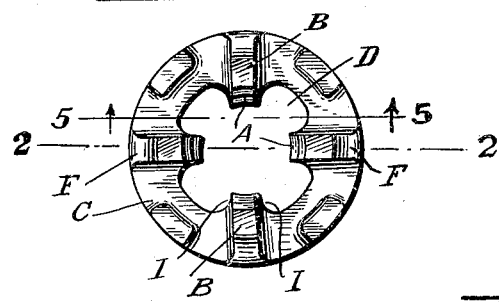
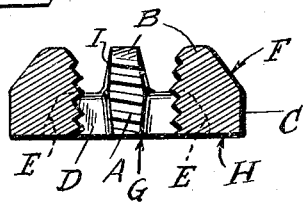
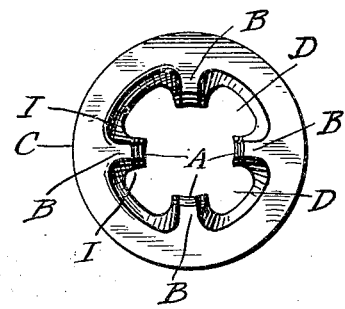
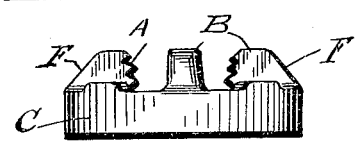
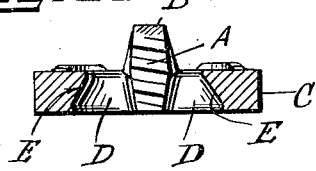
Inventor
Fred W. Wells Patented Sept. 20, 1932

1,878,216

UNITED STATES PATENT OFFICE

FRED W. WELLS, OF GREENFIELD, MASSACHUSETTS

SCREW CUTTING DIE

Application filed August 15, 1928. Serial No. 299,858.

The object of my invention relates to the described shape in which the die is made and further to the method of forging to secure the same shape making possible a saving in their manufacture of both material and labor.

A further object is in the completed dies making better screw threads because of the open spaces between the raised projections giving greater clearance for chips and more space for the better application of lubricating oil to the cutting teeth of the die when being used in the usual way in screw plates or machines, for which they are intended.

Referring to the drawing:

Fig. 1 is a face view showing four raised projections or lands with the thread forming teeth on their inner ends.

Fig. 2 is a vertical sectional view on the line 2—2 of Fig. 1.

Fig. 3 is a bottom plan view of the die.

Fig. 4 is a side elevational view looking from the left of Fig. 1, and

Fig. 5 is a sectional view on the line 5—5 of Fig. 1 showing the interior construction.

To properly describe my improvement, it is necessary to explain how screw cutting dies are otherwise made at the present line, viz; a common way such dies are made is to first drill a hole in the center of a blank piece of steel, the outside of which may be round, square, or hexagon or other shape; next, forming a screw thread in the drilled hole by running a screw thread cutting tap through the hole; then a number of round holes are drilled at the edge of the center hole to form lands on which cutting teeth are formed. These holes are for allowing chips to pass. My invention consists in forming three or more projections on a piece of steel of any desired shape; such projections are to be raised above either one or both of the two opposite flat faces of the blank piece of steel, or body of the die and also projecting inward into a central hole. As stated these projections may be raised on either one or both of two opposite flat sides of a piece of steel, or body of the die, but I prefer to have them on one side only because of the greater space which is left for chips made in cutting, at the starting point of the die, and I have so described the same, but this in nowise affects my claim for an improvement if they project from both sides of the die. These projections are preferably formed by forging hot and are of suitable width for cutting teeth, commonly called lands, and on the inner ends of these lands teeth are formed in the usual way.

Referring to the drawing in detail:

A designates screw forming threads on the inwardly projecting ends of the lands B. These lands are formed integral with the flat ring-like member C and preferably by forging white hot. The threads A, as shown, extend the entire length of the lands. Located between the lands B are conical-shaped recesses D, as shown clearly in Figs. 3 and 5. The object and purpose of these recesses is to permit the metal chips to freely pass thru the central opening between the ends of the lands, especially when the threads are first being formed on a piece of work, and, for oiling the tool.

Fig. 3 shows a bottom plan view of the die with the inner ends of the conical-shaped openings D, as indicated at E. The outer edges of the lands B are made slightly inclined, as shown at F, for the purpose, when the die is put into a holder, or chuck, they may be slightly moved inward for accurately adjusting the same, in order that the finished or cut thread will be of the right diameter. The flat ring C being forged integral with the projections B, forms a rigid tool and one that will not spring or give, when a thread is being formed on a piece of work.

It will be noticed that the upper inner edges of the lands B are inclined in the usual way for permitting the die to easily start cutting a thread. It will also be noticed that the bottom ends G of the lands B lie in the same plane as the bottom of the ring shown at H. This permits a thread to be cut close to or against a shoulder of a piece of work.

Referring to the figures, it will be noticed that the lands B are rigidly supported or braced on opposite sides of the same, as indicated at I, whereby, when the lands are in use, they are rigidly retained in place against any springy action.

One of the advantages of the present die is that it may be formed or forged while hot from a single piece of material with the central opening and the conical recesses D. The lands B are formed with threads which extend the full thickness of the ring C, thus materially strengthening the die.

What I claim is:

1. A screw cutting die comprising a flat integral ring-like body portion formed with a central cone-shaped opening tapering from its bottom face to the upper face of said body portion, a plurality of integral lands formed as a part of said body portion extending from its bottom face and projecting above its upper face and inwardly toward the center of said cone-shaped opening and having their outer upper edges above the upper surface of said body portion inclined or tapering upwardly from the outer annular surface of said body portion, and a plurality of thread-forming teeth formed on the inner edge of each of said lands from the top of said lands to the bottom face of said body portion.

2. As an article of manufacture, a die comprising a ring member having a centrally disposed cone-shaped opening extending from the bottom face of the ring member to its upper face, and also formed with a plurality of integral, radially disposed lands, extending above one face only of the ring member and into the centrally disposed opening in said ring member and to the bottom face of the ring member, thread cutting teeth formed on the inner surfaces of said lands, for their full length, and terminating in the plane of the opposite face of the ring member, and inclined-shaped recesses formed in the ring member between said lands and extending upward from the bottom face through the ring member to the opposite upper face.

FRED W. WELLS.